United States Patent
Henson et al.

(10) Patent No.: US 7,428,603 B2
(45) Date of Patent: Sep. 23, 2008

(54) SYSTEM AND METHOD FOR COMMUNICATING WITH MEMORY DEVICES VIA PLURALITY OF STATE MACHINES AND A DMA CONTROLLER

(75) Inventors: Matthew Henson, Austin, TX (US); David Cureton Baker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 386 days.

(21) Appl. No.: 11/171,919

(22) Filed: Jun. 30, 2005

(65) Prior Publication Data

US 2007/0005825 A1    Jan. 4, 2007

(51) Int. Cl.
    *G06F 13/28*    (2006.01)
(52) U.S. Cl. .............................. 710/22; 710/23; 710/24
(58) Field of Classification Search .................. 710/22, 710/23, 24
    See application file for complete search history.

(56) References Cited

U.S. PATENT DOCUMENTS

| | | | |
|---|---|---|---|
| 5,822,251 A | 10/1998 | Bruce et al. |
| 5,828,856 A | 10/1998 | Bowes et al. |
| 5,884,095 A | 3/1999 | Wolford et al. |
| 5,983,301 A | 11/1999 | Baker et al. |
| 6,014,729 A | 1/2000 | Lannan et al. |
| 6,115,770 A | 9/2000 | Gehman |
| 6,209,052 B1 | 3/2001 | Chin et al. |
| 6,230,219 B1 | 5/2001 | Fields, Jr. et al. |
| 6,275,877 B1 | 8/2001 | Duda |
| 6,311,234 B1 | 10/2001 | Seshan et al. |
| 6,418,488 B1 | 7/2002 | Chilton et al. |
| 6,449,665 B1 | 9/2002 | Schanding |
| 6,453,367 B2 | 9/2002 | Barry |
| 6,463,059 B1 | 10/2002 | Movshovich et al. |
| 6,477,598 B1 | 11/2002 | Yu |
| 6,662,258 B1 | 12/2003 | Lukanc et al. |

(Continued)

FOREIGN PATENT DOCUMENTS

JP    2003134295    5/2003

(Continued)

OTHER PUBLICATIONS

International Search Report for International Application No. PCT/US05/38434, mailed on Jul. 3, 2007.

(Continued)

*Primary Examiner*—Niketa I Patel
(74) *Attorney, Agent, or Firm*—Toler Law Group

(57) ABSTRACT

The disclosure is directed to a device including a memory interface. The memory interface includes a data interface, a first state machine and a second state machine. The first state machine includes a first chip select interface and a first ready/busy interface. The first state machine is configured to select and monitor a first memory device via the first chip select interface and the first ready/busy interface, respectively, when the first memory device is coupled to the data interface. The second state machine includes a second chip select interface and a second ready/busy inter-face. The second state machine is configured to select and monitor a second memory device via the second chip select interface and the second ready/busy interface, respectively, when the second memory device is coupled to the data interface.

19 Claims, 4 Drawing Sheets

U.S. PATENT DOCUMENTS

| | | |
|---|---|---|
| 6,697,906 B1 | 2/2004 | Ayukawa et al. |
| 6,804,729 B2 | 10/2004 | Swanberg |
| 6,813,652 B2 | 11/2004 | Stadler et al. |
| 6,816,750 B1 | 11/2004 | Klaas |
| 6,816,923 B1 | 11/2004 | Gray et al. |
| 6,816,940 B2 | 11/2004 | Brooks et al. |
| 6,823,402 B2 | 11/2004 | Smith et al. |
| 6,829,660 B2 | 12/2004 | Liu et al. |
| 6,880,035 B1 | 4/2005 | Groeger et al. |
| 2001/0052056 A1 | 12/2001 | Acton et al. |
| 2002/0194448 A1* | 12/2002 | Yu .............................. 711/173 |
| 2003/0013249 A1 | 1/2003 | Honma et al. |
| 2003/0169263 A1* | 9/2003 | Lavelle et al. ................ 345/531 |
| 2003/0212859 A1 | 11/2003 | Ellis et al. |
| 2003/0217202 A1 | 11/2003 | Zilberman et al. |
| 2004/0004805 A1 | 1/2004 | Jerding et al. |
| 2004/0006666 A1 | 1/2004 | Moss |
| 2004/0030770 A1 | 2/2004 | Pandya |
| 2004/0049624 A1 | 3/2004 | Salmonsen |
| 2004/0054864 A1 | 3/2004 | Jameson |
| 2004/0230759 A1 | 11/2004 | Braun et al. |
| 2005/0050245 A1 | 3/2005 | Miller et al. |
| 2005/0050283 A1 | 3/2005 | Miller et al. |

FOREIGN PATENT DOCUMENTS

| | | |
|---|---|---|
| TW | 546668 | 8/2003 |
| TW | 200419265 A | 9/2004 |
| TW | 200421735 A | 10/2004 |
| WO | WO 01/35246 A2 | 5/2001 |
| WO | WO 01/97576 A2 | 12/2001 |
| WO | WO 05/013084 A2 | 2/2005 |
| WO | WO 05/024555 A2 | 3/2005 |
| WO | WO 05/024556 A2 | 3/2005 |

OTHER PUBLICATIONS

Search Report for Patent Application ROC (Taiwan) Patent Application No. 094141029, issuance date Sep. 3, 2007.

* cited by examiner

US 7,428,603 B2

SYSTEM AND METHOD FOR COMMUNICATING WITH MEMORY DEVICES VIA PLURALITY OF STATE MACHINES AND A DMA CONTROLLER

FIELD OF THE DISCLOSURE

This disclosure, in general, relates to systems and methods of communicating with memory devices.

BACKGROUND

Increasingly, consumers are demanding portable devices, such as personal digital assistants (PDA's), MP3 players, portable memory systems, advanced cell phone systems and cameras. Traditional non-volatile memory storage systems, such as floppy disks, hard drives, and optical drives, are generally unsuitable for use in portable devices because they suffer from mechanical failures, excess weight, large size and high energy consumption. As a result, manufacturers of portable devices are turning to solid-state memory systems, such as flash memory and electrically erasable programmable read-only memory (EEPROM).

However, such solid-state memory systems tend to have long latency periods for processing data. Typically, commands and addresses can be transferred to the solid-state memory systems at rates on the order of nanoseconds, while data processing by the solid-state memory in response to the commands and addresses often takes a significantly longer time, as high as microseconds.

Traditional memory interfaces access one solid-state memory system at a time, pausing for a ready signal from the solid-state memory system. Even in memory interfaces that have access to multiple solid-state memory devices, operations on the memory devices are typically performed one at a time, with the interface pausing for completion of each operation before beginning another operation. For example, traditional memory interfaces may write one page to a first memory device and pause, waiting for the write operation to be completed, before writing a second page to a second memory device. In another example, traditional memory interfaces wait for a block erase command to complete on a first memory device before beginning a block erase command on a second memory device. In other traditional systems, operations on all devices must complete before a second set of operations may begin.

As such, data buses between a memory interface and a solid-state memory device, in addition to data buses between the memory interface and a direct memory access controller, may suffer from extended periods of inactivity during memory device data processing, resulting in a reduced effective use of the data buses. For data intensive activities and, in particular, for activities on devices, such as MP3 players and cameras, reduced effective data transfer rates through data buses result in reduced performance of the devices. As such, an improved system and method for transferring data to and from memory devices would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWING(S)

In a particular embodiment, the disclosure is directed to a data processing device including a memory interface. The memory interface includes a data interface configured to access one or more solid-state memory devices. In addition, the memory interface includes a first state machine having a first chip select interface and a first ready/busy interface. The memory interface also includes a second state machine having a second chip select interface and a second ready/busy interface. In one embodiment, the first chip select interface and the first ready/busy interface are coupled to a first memory device, such as a NAND flash memory device. The second chip select interface and the second ready/busy interface may be connected to a second memory device, such as a second NAND flash memory device. The first and second memory devices may be of the same type, for example, flash memory devices.

In addition, the data processing device including the memory interface may also include a processor core connected to a first internal data bus. The first internal data bus may be connected to a bridge that is connected to a second internal data bus. The second internal data bus may be connected to the memory interface. In one exemplary embodiment, the bridge may include a direct memory access (DMA) controller. The first state machine may connect to the DMA controller via first channel and the second state machine may connect to the DMA controller via a second channel. In a further exemplary embodiment, random access memory (RAM), such as static random access memory (SRAM), is coupled to the first internal data bus. In a particular embodiment, the processor core, bridge, and memory interface are disposed on a single substrate, such as to form a system on a chip, and the memory devices are external memory devices connected to interface pins connected to the memory interface on the chip.

In another exemplary embodiment, the disclosure is directed to a method of accessing memory devices. The method includes sending a first command to a first flash memory device when the second flash memory device is in a busy state. The first flash memory device and a second memory device are coupled to an external data interface. In response to the command and associated addresses and data, the first flash memory device enters a busy state. The method further includes monitoring a ready/busy signal of the second flash memory device and sending a second command to the second flash memory device when the first flash memory device is in the busy state and the second flash memory device is in a ready state. The method may also include monitoring a ready/busy signal from the first flash memory device and notifying a DMA controller based on the ready/busy signal.

Figure 1:
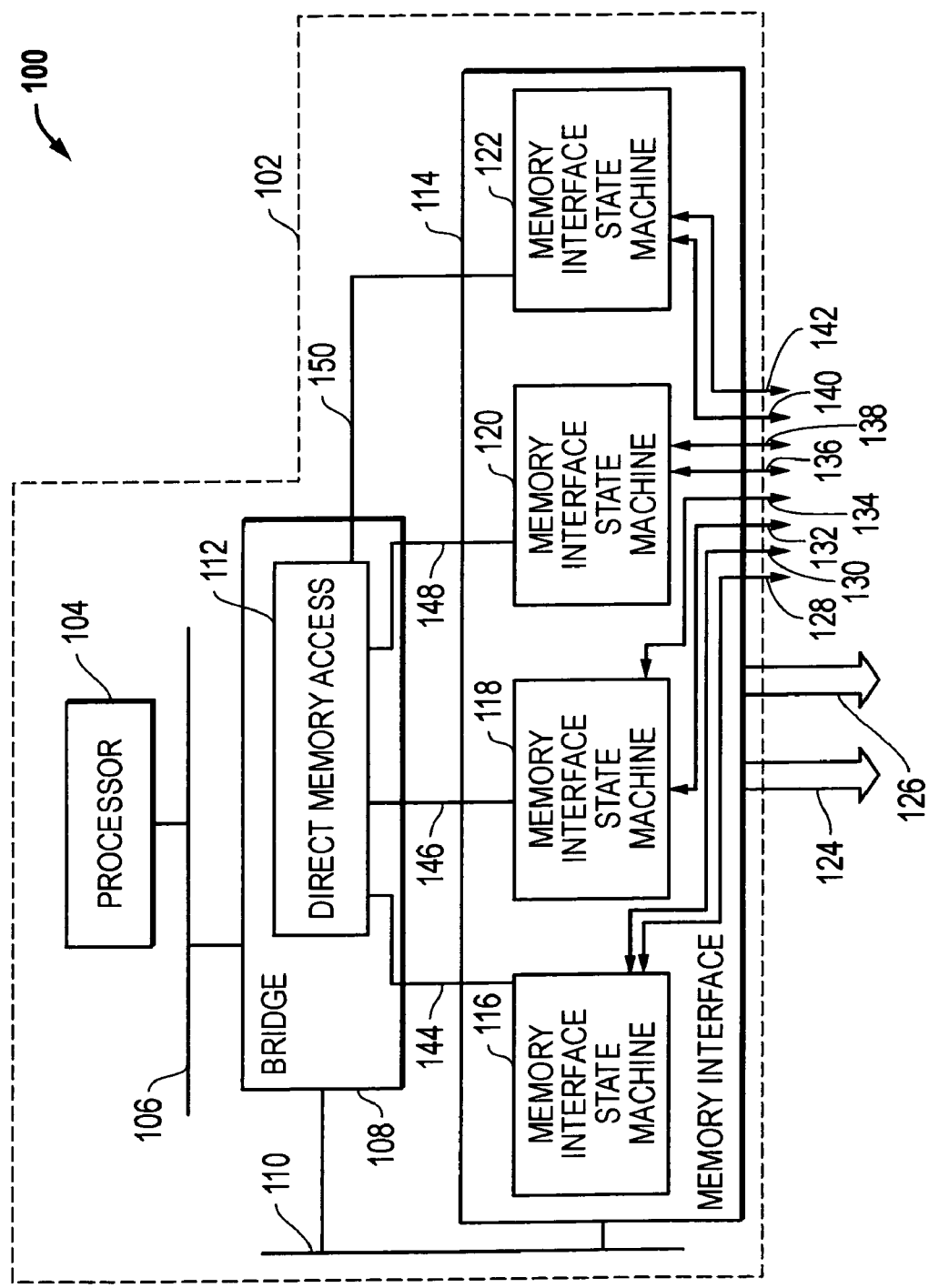
FIGS. 1 and 2 include illustrations of exemplary embodiments of data processing device components.

FIG. 1 includes an illustration of an exemplary embodiment of a representative device 100. The device 100 includes a processor 104 coupled to a first internal data bus 106. A bridge 108 is coupled to the first internal data bus 106 and to a second internal data bus 110. A memory interface 114 is coupled to the second internal data bus 110. In one particular embodiment, the first internal data bus 106 is an advanced high performance bus (AHB), such as an ARM® AHB, and the second internal data bus 110 is an advanced high speed peripheral bus (APBH), such as an AHB adapted for accessing peripheral devices.

In one exemplary embodiment, the bridge 108 includes a direct memory access (DMA) controller 112. The DMA controller 112 may, for example, be designed to handle multi-page operations without processor 104 intervention. For example, the DMA controller 112 may use a link descriptor function with branching capability to automatically handle operations to read/write multiple pages.

The device 100 includes a memory interface 114 that accesses a data interface 126 and control lines 124. The control lines 124 may, for example, include lines associated with command latch enable, address latch enable, read enable, write enable, and write protect functions. The data interface 126 may, for example, be an 8-bit data interface, a 16-bit data interface, or a 32-bit interface. In one exemplary embodiment, the memory interface 114 includes a set of memory interface state machines 116, 118, 120 and 122. Each of the memory interface state machines (116, 118, 120 and 122) includes a unique channel (144, 146, 148, and 150) to access the DMA controller 112. In addition, each of the memory interface state machines (116, 118, 120 and 122) includes an individual chip select interface and an individual ready/busy interface. For example, memory interface state machine 116 may include a chip select interface 128 and a ready/busy interface 130. In a further example, memory interface state machines 118, 120 and 122 include respective chip select interfaces 132, 136 and 140 and respective ready/busy interfaces 134, 138 and 142. The respective chip select and ready/busy interfaces of the individual state machines may each be attached to a separate external memory device, such as NAND or NOR flash memory devices. Each of the flash memory devices may also be coupled to the shared control lines 124 and shared data lines 126.

In one exemplary embodiment, the memory interface 114 includes registers configured to store control information associated with attached peripheral devices, such as the flash memory devices. The registers may, for example, store control information, such as data hold times, address setup times, and data setup times. A data register may also be provided. These times may be specified in number of clock cycles. Alternatively, the registers may be included with the DMA.

In operation, the processor core 104 provides the DMA controller 112 with a linked set of descriptors via data bus 106. Based on the link descriptors, the DMA controller 112 accesses the individual memory devices via the memory interface state machines. For example, to access a first flash memory device, the DMA controller 112 may interact with memory interface state machine 116. The memory interface state machine 116 enables the first flash memory device via chip enable 128. The memory interface 114 may communicate a command and address to the first flash memory device via control lines 124 and data lines 126. Typically, the first memory device enters a busy state in response to the commands, address, and optionally, data. For example, the command may be a read command followed by an address from which data is to be read. In another exemplary embodiment, the command may be a write command followed by an address where data is to be stored and the data to be stored at the address. Alternatively, other commands may be provided to the first memory device, such as block erase commands. The memory interface state machine 116 monitors the ready/busy state of the first memory device via the ready/busy interface 130.

In addition, the DMA controller 112 may access a second flash memory device connected to the shared control lines 124 and data lines 126. In one exemplary embodiment, the DMA controller 112 accesses the second memory device while the first memory device is in a busy state. Typically, command, address and data transfer rates are on the order of nanoseconds, while busy states associated with internal processing of data within the memory devices persist on the order microseconds. As such, commands, addresses and data may be sent to multiple flash memory devices during the time a single flash memory device is busy. In one example, the memory interface state machine 118 may enable a second memory device via the chip enable interface 132 and the memory interface 114 may provide commands, addresses and data via control lines 124 and data lines 126. As a result, the second flash memory device enters a busy state and is monitored by the memory interface state machine 118 via ready/busy interface 134. Similarly, the DMA controller 112 may access a third and a fourth memory devices via respective memory interface state machines 120 and 122.

When one of the memory devices enters a ready state, an associated memory interface state machine may send an interrupt request to the DMA controller 112. For example, when the first flash memory device is finished processing data, the memory interface state machine 116 may send an interrupt request to the DMA controller 112. The DMA controller 112 may communicate with the first flash memory device while other flash memory devices are busy. As such, the DMA controller 112 may perform multiple page operations by independently monitoring the states of individual memory devices and accessing more than one memory device during the processing cycle of a single memory device.

In a particular embodiment, the processor 104, the bridge 108 and the memory interface 114 are disposed on a common substrate 102. For example, the processor 104, the bridge 108 and the memory interface 114 may form a "system on a chip." Multiple memory devices may be connected to the memory interface 114 via pins provided on the chip. For example, the control interface 124 may include control pins, such as command latch enable and address latch enable pins. The data interface 126 may, for example, include a number of data pins and each of the chip select interfaces and ready/busy interfaces may include respective pins. In a particular example, one NAND flash memory device may be connected to the memory interface for each state machine in the memory interface. In an alternative embodiment, the components may be formed on separate substrates.

Figure 2:
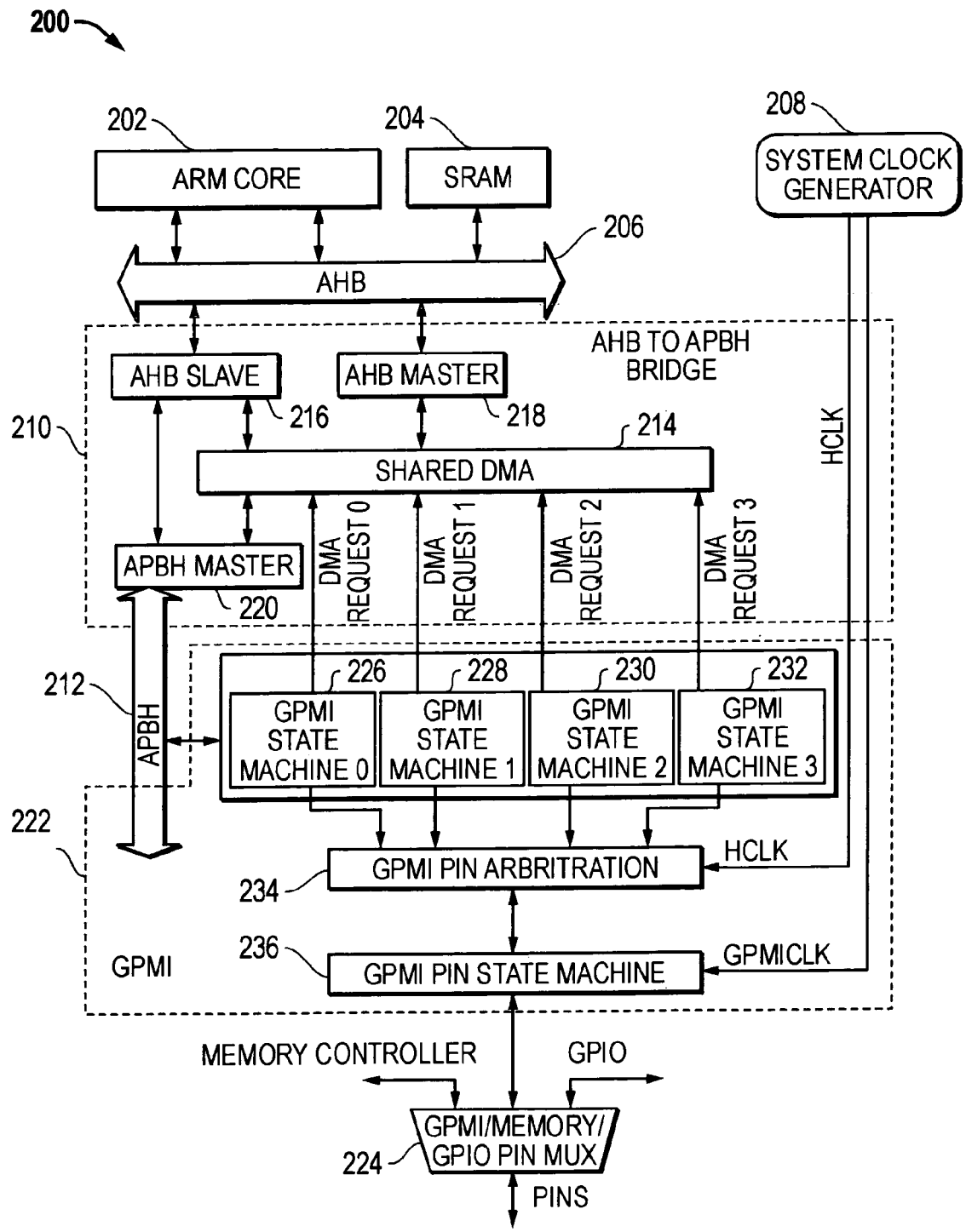

FIG. 2 includes an illustration of another exemplary device 200. The device 200 includes an ARMS processor core 202 coupled to an AHB data bus 206. In addition, random access memory 204, such as static random access memory (SRAM), may be coupled to the AHB data bus 206. A bridge 210 may be provided between the AHB data bus 206 and an APBH data bus 212. The bridge 210 includes, for example, a shared direct memory access (DMA) controller 214. In addition, the bridge 210 includes an AHB slave 216 coupled to the shared DMA controller 214 and includes an APBH master 220. An AHB master 218 may be coupled to the AHB data bus 206 and the shared DMA controller 214.

The APBH data bus 212 is coupled to a general purpose memory interface (GPMI) 222. In one exemplary embodiment, the GPMI 222 includes a data register (not shown) that is accessible to the APBH data bus 212. The data register may also be used in conjunction with the state machines to transfer data to and from the memory devices. In a particular embodiment, the data register includes a set of bits, all or subsets of which may be used at a particular time for transferring data. For example, the data register may include 32 bits and may operate in 32-bit mode, 16-bit mode or 8-bit mode.

In one exemplary embodiment, the GPMI 222 provides an interface to external flash memory devices, such as NAND flash memory devices. In a particular embodiment, the GPMI 222 may provide access to a set of memory devices of a common type, each accessible via the general purpose input/output (GPIO) pin multiplexer 224. For example, the set of memory devices may be a set of flash memory devices, such as NAND flash memory devices.

In a particular embodiment, the GPMI 222 includes a set of GPMI state machines 226, 228, 230, and 232. Each of the GPMI state machines (226, 228, 230, and 232) includes a chip select interface and a ready/busy interface. In addition, each GPMI state machine (226, 228, 230, and 232) has an individual channel to the shared DMA controller 214. The chip select and ready/busy interfaces of each of the GPMI state machines (226, 228, 230, and 232) passes through a GPMI pin arbitration unit 234 and a GPMI pin state machine 236 to interface with the general purpose input/output (GPIO) pin multiplexer 224. Individual flash memory devices may be connected to the pins connected to the GPIO pin multiplexer 224.

In addition, the system 200 may include a system clock generator 208 that generates a clock (HCLK) signal and a GPMI clock (GPMICLK) signal. The GPMICLK signal may be used as a timing reference for the flash input/output. Since commercially available flash memory devices have different timing requirements, the GPMICLK signal may be adjusted for each application. The actual read/write strobe timing parameters may be adjusted in the register descriptions. Using different clock signals, the state machines and the flash input/output may operate at separate clock rates.

As illustrated, the GPMI 222 supports up to four chip selects each with independent ready/busy signals. Flash memory devices, such as NAND or NOR flash memory devices, may be attached to shared data lines and control lines. As such, the GPMI 222 may actively communicate with a single memory device at a given time. However, each of the memory devices can concurrently perform internal read, write or erase operations.

In one particular embodiment, the DMA controller 214 may perform normal flash access functions without intervention by the ARM® core 202. While typical flash memory devices do not support multiple page read/write commands, the GPMI 222 and the DMA controller 214 may handle multi-page operations without processor intervention. In one exemplary embodiment, the DMA controller 214 uses a linked descriptor function with branching capability to automatically handle operations for multi-page read/write.

Figure 3:
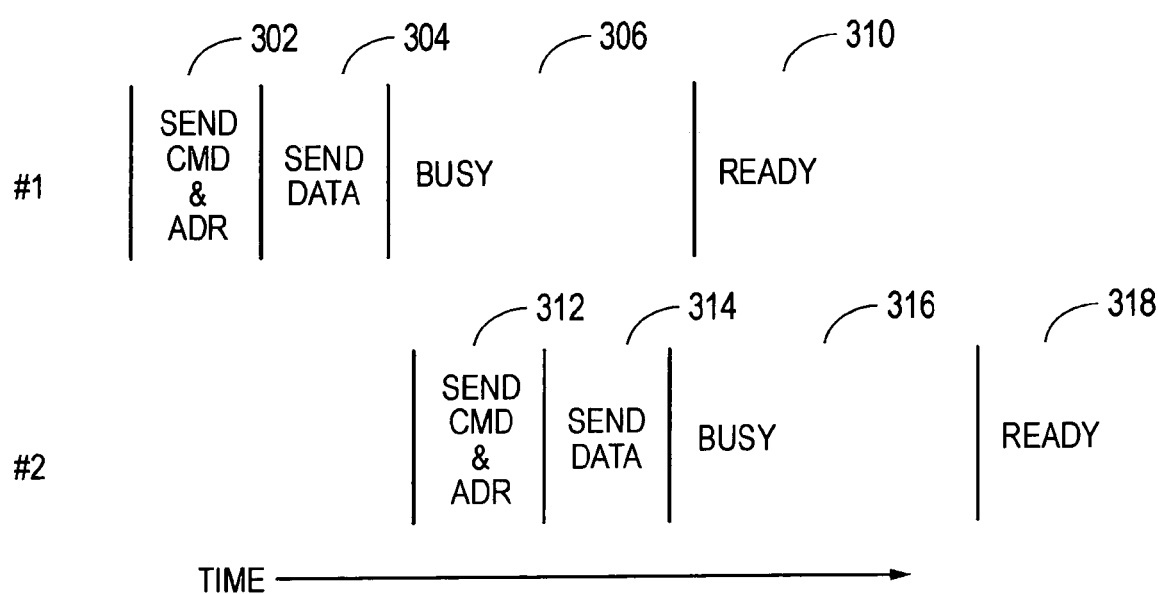
FIG. 3 includes an illustration of an exemplary timeline for memory device access.

Referring to FIG. 3, a timing diagram illustrates that commands and addresses may be sent to a second flash memory device while a first flash memory device is busy. For example, a first chip select may activate a first flash memory device and a first set of commands and addresses may be sent to a first flash memory device, as illustrated at 302. In the case of a write operation, data may also be sent to the first flash memory device, as illustrated at 304. In response to the command and address, the first flash memory device enters a busy state, as illustrated at 306. A busy state is typically much longer (on the order of microseconds) than the time for sending of commands, addresses and data (typically on the order of nanoseconds). A first state machine associated with the first flash memory device holds the chip select in a selected state while the flash memory device is in a busy state and monitors the ready/busy signal of flash memory device.

While the first flash memory device is in a busy state, a second flash memory device may be selected via a second memory interface state machine. The second flash memory device may be enabled using a chip select interface of the second memory interface state machine. Commands, addresses and optionally data may be sent to the second flash memory device, as illustrated at 312 and 314. As such, the memory interface may send commands, addresses, and optionally data via shared control and data interfaces to the second flash memory device while the first chip select and the second chip select are active and the first ready/busy interface is in a busy state. In response, the second flash memory device enters a busy state, as illustrated at 316, that is monitored by the second memory interface state machine.

Subsequently, the first flash memory device may enter a ready state, as illustrated at 310. In response, the first memory interface state machine may notify the DMA controller of the status of the first flash memory device. For example, the first memory interface state machine may send an interrupt request to the DMA controller. In the case of a read command, data may be read from the first flash memory device. As such, the data processing device may optionally send commands, addresses and data to multiple NAND flash memory devices while previously accessed NAND flash memory devices are in a busy state.

Figure 4:
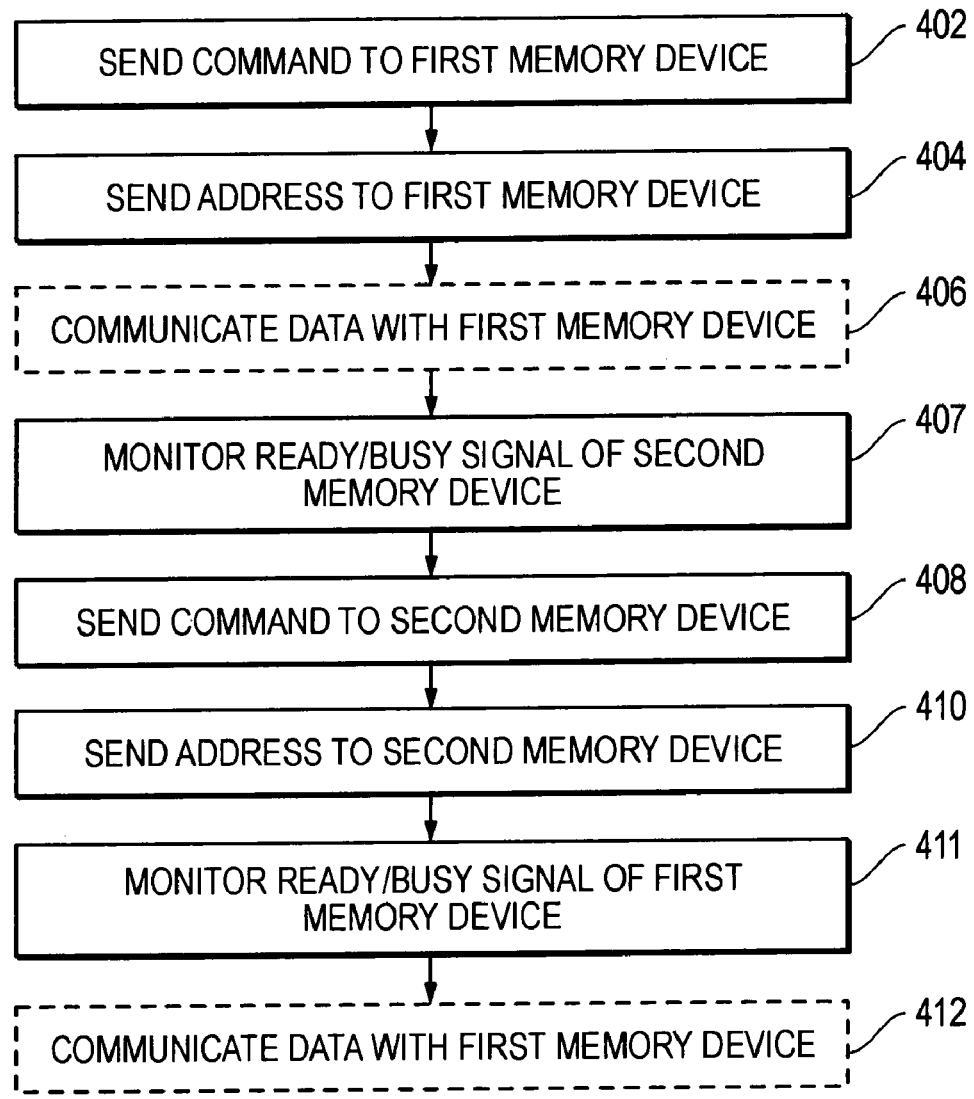
FIG. 4 includes an illustration of an exemplary method for accessing memory devices, which may be performed by data processing devices, such as the data processing devices illustrated in FIGS. 1 and 2.

FIG. 4 includes an illustration of an exemplary method for accessing external memory devices, such as NAND flash memory devices. As illustrated, the method 400 includes sending a command to a first memory device, as illustrated at 402. The method may also include sending an address to the first memory device, as illustrated at 404. Depending upon the nature of the command, the system may also communicate data with the first memory device, as illustrated at 406. For example, when the command is a write command, data may be forwarded to the first memory device for storage therein.

In response to the command and address, the first flash memory device enters a busy state. Optionally, the DMA controller enables a second memory device via a second memory interface state machine. For example, a second memory interface state machine may monitor a ready/busy signal of the second memory device to determine whether the second memory device has entered or is in a ready state, as illustrated at 407. When the second memory device is in a ready state, the second memory interface state machine may activate a second chip select connected to the second flash memory device and, as such, enable the second memory device. A command may be sent to the second memory device, as illustrated at 408, and an address and optionally data may be sent to the second memory device, as illustrated at 410. As a result, the second memory device may enter a busy state.

After processing the data, such as accessing a flash memory location to retrieve, store, or delete data, the first memory device enters a ready state. A first state machine may monitor a ready/busy signal of the first memory device to determine when the first memory device enters the ready state, as illustrated at 411. In a particular embodiment, the second memory may be in a busy state when the first state machine determines that the first memory device has entered a ready state. Depending on the nature of the first command sent to the first memory device, additional data may be communicated with the first memory device, as illustrated at 412. For example, when the command and address sent to the first memory device are associated with a read command, data may be read from the first memory device. The second memory device may be busy during the communication with the first memory device. Monitoring read/busy signals of the first and second memory devices may be performed concurrently with one or more of the other method processes.

In response to a ready signal from the first memory device, the first state machine may send a signal, such as an interrupt request, to the DMA controller. In addition, the first state machine may include a timeout counter and send a signal to the DMA controller in the event that the first memory device does not return a ready signal within a specified time (i.e., upon timeout). In the case of an error, the DMA controller may branch to an alternate descriptor.

As such, the state of the memory devices coupled to the same data and control interfaces may be determined independently. The data and control interfaces may be used to communicate with each of the memory devices as the memory device enter a ready state, independent of the state of the other memory devices coupled to the data and control interfaces.

Particular embodiments of the above described memory interfaces may be implemented in a system on a chip. The system on a chip may be included in a portable device, such as an MP3 player, PDA, or advanced cellular telephone. In a particular embodiment, the chip includes more than one memory interface including at least one of the memory interfaces embodying the above described memory interface. As such, multiple flash memory devices may be connected to a memory interface that includes multiple state machines, while other memory devices may be connected to other memory interfaces. In a particular example, a memory interface including multiple state machines may be adaptable to couple to other types of memory devices, such as advanced technology attachment (ATA) memory devices.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device comprising:
    a memory interface adapted to be coupled to a direct memory access (DMA) controller via a data bus and further adapted to be coupled to at least a first memory device and a second memory device via a data interface, the memory interface comprising:
    a first state machine including a first chip select interface, a first ready/busy interface, and a first channel to the DMA controller, the first state machine configured to select and monitor the first memory device via the first chip select interface and the first ready/busy interface, respectively, when the first memory device is coupled to the data interface; and
    a second state machine including a second chip select interface, a second ready/busy interface, and a second channel to the DMA controller, the second state machine configured to select and monitor the second memory device via the second chip select interface and the second ready/busy interface, respectively, when the second memory device is coupled to the data interface.

2. The device of claim 1, wherein the DMA controller is configured to perform a multiple page operation without processor intervention.

3. The device of claim 1, wherein the DMA controller is configured to perform a multiple page operation by independently monitoring the states of individual memory devices and accessing more than one memory device during the processing cycle of a single memory device.

4. The device of claim 3, wherein the DMA controller is configured to perform a multiple page operation via the memory interface.

5. The device of claim 1, wherein the memory interface is accessible to an advanced high speed peripheral bus.

6. The device of claim 1, wherein the first memory device is a first flash memory device coupled to the first chip select interface and the first ready/busy interface and wherein the second memory device is a second flash memory device coupled to the second chip select interface and the second ready/busy interface.

7. The device of claim 1, wherein the memory interface further comprises a third state machine including a third chip select interface, a third ready/busy interface, and a third channel to the DMA controller.

8. The device of claim 1, further comprising an arbitration circuit coupled to the first and second state machines.

9. The device of claim 8, further comprising a pin state machine coupled to the data interface and the arbitration circuit.

10. A method, comprising:
    sending a first command to a first memory device when a second memory device is in a busy state, the first memory device and the second memory device coupled to a data interface, the first memory device entering a busy state in response to the first command;
    monitoring a ready/busy signal of the second memory device;
    sending a second command to the second memory device when the first memory device is in the busy state and the second memory device is in a ready state;
    monitoring a ready/busy signal of the first memory device;
    signaling a direct memory access (DMA) controller from a first state machine via a first channel in response to the ready/busy signal of the first memory device; and
    signaling the DMA controller from a second state machine via a second channel in response to the ready/busy signal of the second memory device.

11. The method of claim 10, wherein the first memory and second memory are both flash memory devices.

12. The method of claim 10, further comprising communicating data with respect to the second memory device via the data interface when the first memory device is in the busy state.

13. The method of claim 10, further comprising sending a third command to a third memory device when the first memory device and the second memory device are in respective busy states, the third memory device coupled to the data interface.

14. A device comprising:
    a processing core;
    a first internal data bus accessible to the processing core;
    a second internal data bus;
    a bridge accessible to the first internal data bus and the second internal data bus,
        the bridge including a direct memory access (DMA) controller; and
    a memory interface accessible to the DMA controller via the second internal data bus, the memory interface comprising:
    a data interface;
    a control interface;
    a first state machine including a first chip select interface, a first
        ready/busy interface, and a first channel to the DMA controller, the first state machine configured to select and monitor a first memory device via the first chip select interface and the first ready/busy interface, respectively, when the first memory device is coupled to the data interface and the control interface; and a second state machine including a second chip select interface, a second ready/busy interface, and a second channel to the DMA controller, the second state machine configured to select and monitor a second memory device via the second chip select interface and the second ready/busy interface, respectively, when the second memory device is coupled to the data interface and the control interface.

15. The device of claim 14, wherein the processing core, the bridge, and the memory interface are disposed on a particular substrate.

16. The device of claim 14, further comprising random access memory coupled to the first internal data bus.

17. The device of claim 14, wherein the first memory device is a first flash memory coupled to the data interface, the control interface, the first chip select interface, and the first ready/busy interface and wherein the second memory device is a second flash memory coupled to the data interface, the control interface, the second chip select interface, and the second ready/busy interface.

18. A device comprising:
a processor core;
an internal data bus accessible to the processor core;
a direct memory access controller accessible to the internal data bus; and
a memory interface accessible to the direct memory access controller, the memory interface comprising:
a memory interface accessible to the direct memory access controller, the memory interface comprising: a first state machine coupled to the direct memory access controller via a first unique channel and a second state machine coupled to the direct memory access controller via a second unique channel;
a first chip select pin coupled to the first state machine;
a first ready/busy pin;
a second chip select pin coupled to the second state machine;
a second ready/busy pin;
a set of shared control pins; and
a set of shared data pins;
wherein the memory interface is configured to communicate via the set of shared control pins and the set of shared data pins with a first flash memory device when the first flash memory device is coupled to the first chip select pin, the first ready/busy pin, the set of shared control pins, and the set of shared data pins when the first and second chip select pins are in active states, and when the second ready/busy pin indicates that a second flash memory device is in a busy state, the second chip select pin, the second ready/busy pin, the set of shared control pins, and the set of shared data pins are coupleable to the second flash memory device.

19. The device of claim 18, wherein the set of shared control pins includes an address latch enable pin and a command latch enable pin.

* * * * *